(12) United States Patent
Kawano (10) Patent No.: US 8,514,450 B2
(45) Date of Patent: Aug. 20, 2013

(54) IMAGE PROCESSING APPARATUS DISPLAYING AN INTERFACE FOR CHANGING PRINT SETTINGS, PRINT CONTROL METHOD, AND PRINT CONTROL PROGRAM

(75) Inventor: Shinichi Kawano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 390 days.

(21) Appl. No.: 12/877,339

(22) Filed: Sep. 8, 2010

(65) Prior Publication Data

US 2011/0058194 A1    Mar. 10, 2011

(30) Foreign Application Priority Data

Sep. 8, 2009   (JP) ................. 2009-207188

(51) Int. Cl.
*H04N 1/60* (2006.01)
(52) U.S. Cl.
USPC .............................. 358/1.9; 358/1.1; 358/442
(58) Field of Classification Search
USPC ............. 358/1.1, 1.9, 401, 442, 448
See application file for complete search history.

(56) References Cited

U.S. PATENT DOCUMENTS

| | | | |
|---|---|---|---|
| 6,489,975 B1* | 12/2002 | Patil et al. | 715/781 |
| 2005/0018236 A1 | 1/2005 | Shirai et al. | |
| 2005/0207767 A1 | 9/2005 | Imayoshi et al. | |
| 2005/0248796 A1* | 11/2005 | Sugahara | 358/1.13 |
| 2007/0002355 A1 | 1/2007 | Kai | |
| 2008/0307212 A1 | 12/2008 | Asano | |
| 2010/0097632 A1* | 4/2010 | Hattori | 358/1.15 |

FOREIGN PATENT DOCUMENTS

| | | |
|---|---|---|
| CN | 1577244 | 2/2005 |
| CN | 1670629 | 9/2005 |
| CN | 1892573 | 1/2007 |
| JP | 2000-231462 | 8/2000 |
| JP | 2002-287924 | 10/2002 |
| JP | 2005-044080 | 2/2005 |
| JP | 2009-015798 | 1/2009 |

* cited by examiner

*Primary Examiner* — Thomas D Lee
(74) *Attorney, Agent, or Firm* — Edwards Wildman Palmer LLP; David G. Conlin; Steven M. Jensen (57) ABSTRACT

An image processing apparatus, a print control method, and a print control program are provided that are capable of printing after changing print setting by an easy operation for a application program in operating. Together with two windows of document creating programs which are operating, a gadget indicating calendar information and a print setting gadget are displayed as gadget programs in an area of the right side of a desktop screen of a PC. When a print setting button of the print setting gadget is selected, the print setting condition corresponding to the selected button and the application program in operating are stored, and when a print request is made from the application program, the setting value of a printer driver is changed for printing.

14 Claims, 12 Drawing Sheets

| PRINT SETTING BUTTON NO. | PRINT SETTING CONDITION |
|---|---|
| a | 2-Up, DOUBLE-SIDED PRINTING, HORIZONTAL-BINDING |
| b | 2-Up, DOUBLE-SIDED PRINTING, VERTICAL-BINDING |
| c | 4-Up, GRAYSCALE |
| d | INITIAL SETTING |

| PRINT SETTING BUTTON NO. | PRINTING PORT |
|---|---|
| e | IP_192.168.0.11 |
| f | IP_192.168.0.12 |
| g | IP_192.168.0.13 |
| h | LPT1: |

| No. | STATUS |
|---|---|
| 1. | READY TO PRINT |
| 2. | COMMUNICATION ERROR |
| 3. | AUTOMATIC TURNING-OFF OF POWER |
| 4. | BEYOND MAINTENANCE PERIOD |
| 5. | PAPER JAM |
| 6. | RUNNING-OUT OF TONER |
| 7. | RUNNING-OUT OF SHEET |

IMAGE PROCESSING APPARATUS DISPLAYING AN INTERFACE FOR CHANGING PRINT SETTINGS, PRINT CONTROL METHOD, AND PRINT CONTROL PROGRAM

CROSS-NOTING PARAGRAPH

This non-provisional application claims priority under 35 U.S.C. §119 (a) on Patent Application No. 2009-207188 filed in JAPAN on Sep. 8, 2009, the entire contents of which are hereby incorporated herein by reference.

FIELD OF THE INVENTION

The present invention relates to an image processing apparatus, a print control method, and a print control program, and more specifically, to an image processing apparatus, a print control method, and a print control program that make it possible to perform printing after changing a print setting of a running application program by a button operation of a GUI (Graphical User Interface) displayed on a desktop when print instruction is given to an image forming apparatus.

BACKGROUND OF THE INVENTION

In accordance with high functionalization, a recent image forming apparatus can perform not only setting of a sheet size and the number of print copies etc. but also setting of various printing conditions such as performing selection of single-sided printing or double-sided printing and selection of color printing or monochrome printing, causing a printing apparatus to perform enlarging or shrinking printing, performing aggregating printing by forming printing areas for a plurality of pages on a single sheet of printing paper, or applying punch or staple, further, changing printing quality depending on usage based on data to be printed that is created by an application program.

Figure 14:
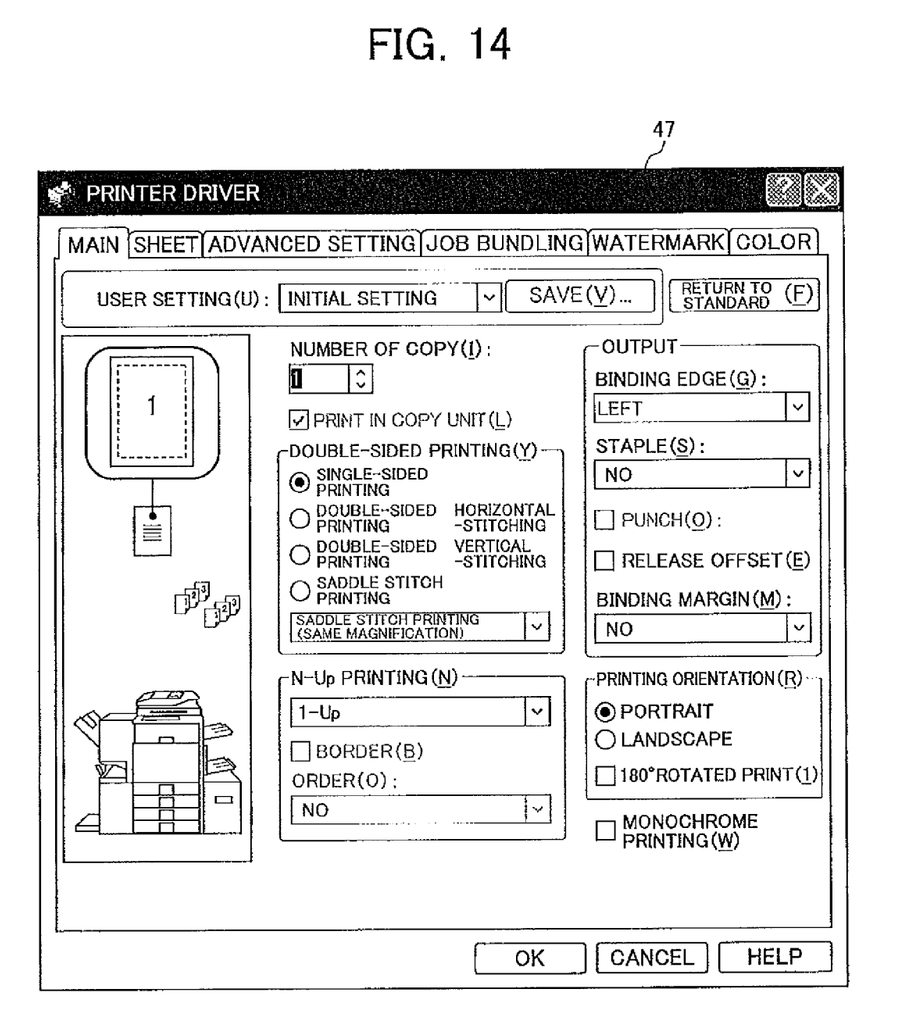
FIG. 14 is a view showing a property screen which is a GUI for setting print conditions of a printer driver.

In addition, when an image processing apparatus gives print instruction to an image forming apparatus, the print instruction is given in the state where a file (data) to be printed is opened on the application as a method for giving print out instruction on the application program. However, when print setting is changed, it is necessary to execute output processing in each case after instructing various kinds of print conditions such as double-sided printing, dual page, necessity of staple, and the number of output copies, as the occasion demands, in the state where a property screen 47 which is a GUI for setting print conditions of a printer driver, for example, as shown in FIG. 14, is displayed, and a user has to perform complicated processing.

Hence, Japanese Laid-Open Patent Publication No. 2000-231462 discloses a method for changing print setting through a property displayed on a program which is always stayed on a desktop. In this method, among a plurality of images of setting items for setting print conditions such as print quality in a printing apparatus, one corresponding to the print condition which is frequently set by a user is arranged on a small screen sheet separately from the normally provided property and displayed on a predetermined display apparatus, so that the printing apparatus is controlled in accordance with the print condition which is set through the image of the setting item on the small screen sheet.

However, in the print control method disclosed in Japanese Laid-Open Patent Publication No. 2000-231462, it is impossible to perform printing by changing print setting by an easy operation for a running application program.

SUMMARY OF THE INVENTION

The present invention aims to provide an image processing apparatus, a print control method, and a print control program that can print by changing print setting by an easy operation for a running application program.

An object of the present invention is to provide an image processing apparatus that gives print instruction to an image forming apparatus and is capable of displaying a first GUI for changing print setting, in which a second GUI for changing print setting is always stayed on a desktop screen, and changing of setting of a printer driver set as default for application programs in operating is enabled by an operation of the second GUI.

An object of the present invention is to provide an image processing apparatus, in which when the operation of the second GUI is carried out, changing of setting is enabled only for an application program whose window is active among the application programs in operating.

An object of the present invention is to provide an image processing apparatus, in which changing of the print setting is changing of a port of an image forming apparatus of an output destination.

An object of the present invention is to provide an image processing apparatus, in which when the port of the output destination is changed, an operational state of the image forming apparatus whose port is changed is displayed.

An object of the present invention is to provide an image processing apparatus, in which the second GUI has a plurality of buttons to each of which different setting condition corresponds and the operation of the GUI is an operation of selecting each of the buttons by a user.

An object of the present invention is to provide a print control method for giving print instruction to an image forming apparatus, comprising steps of causing a second GUI for changing print setting that is different from a first GUI for changing print setting to be always stayed on a desktop screen and carrying out printing in the state that changing of setting of a printer driver set as default for running application programs is enabled by an operation of the second GUI.

An object of the present invention is to provide a print control program for giving printing instruction to an image forming apparatus, which causes a computer to always stay a second GUI for changing print setting that is different from a first GUI for changing print setting on a desktop screen and to carry out printing in the state that changing of setting of a printer driver set as default for running application programs is enabled by an operation of the second GUI.

PREFERRED EMBODIMENTS OF THE INVENTION

Now, referring to the drawings, preferred embodiments of an image processing apparatus, a print control method, and a print control program of the present invention will hereinafter be described.

The image processing apparatus according to the present invention may give print instruction at least to an external image forming apparatus, and the image processing apparatus itself may be an image forming apparatus similar to the external image forming apparatus and may be a computer such as a PC (personal computer).

Figure 1:
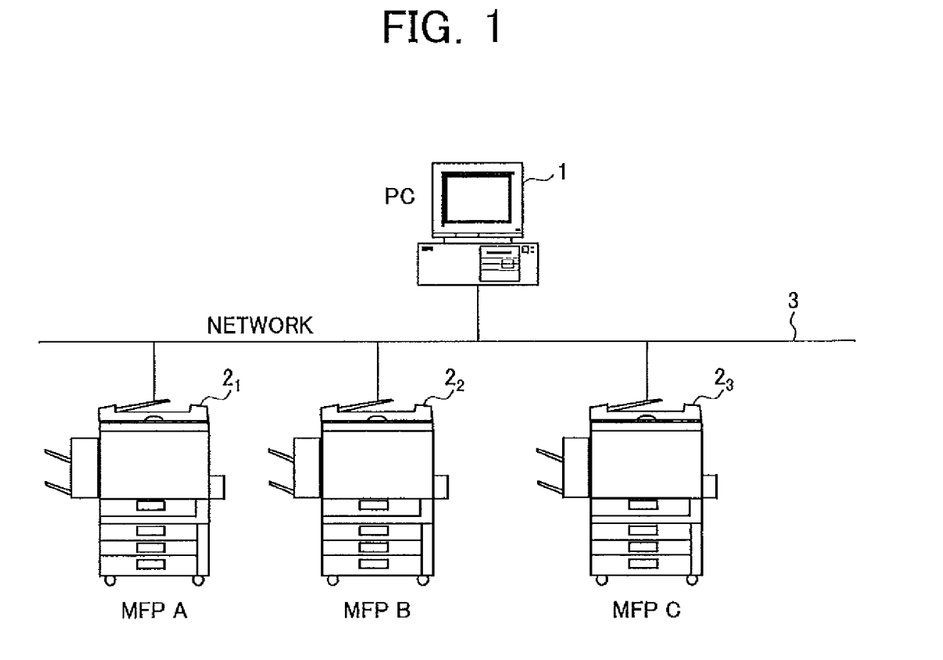
FIG. 1 is a view showing an example of an image processing apparatus according to the present invention, which is constructed as a printing system.

FIG. 1 is a view showing an example of an image processing apparatus according to the present invention, which is constructed as a print system.

In the configuration of FIG. 1, a PC 1 as an example of an information processing apparatus and a plurality of MFPs (Multi-functional Peripherals) $2_1$, $2_2$, and $2_3$ as an example of an image forming apparatus are connected so as to be able to communicate with each other through a predetermined network 3 compliant to IEEE802.3 or the like, for example.

Figure 2:
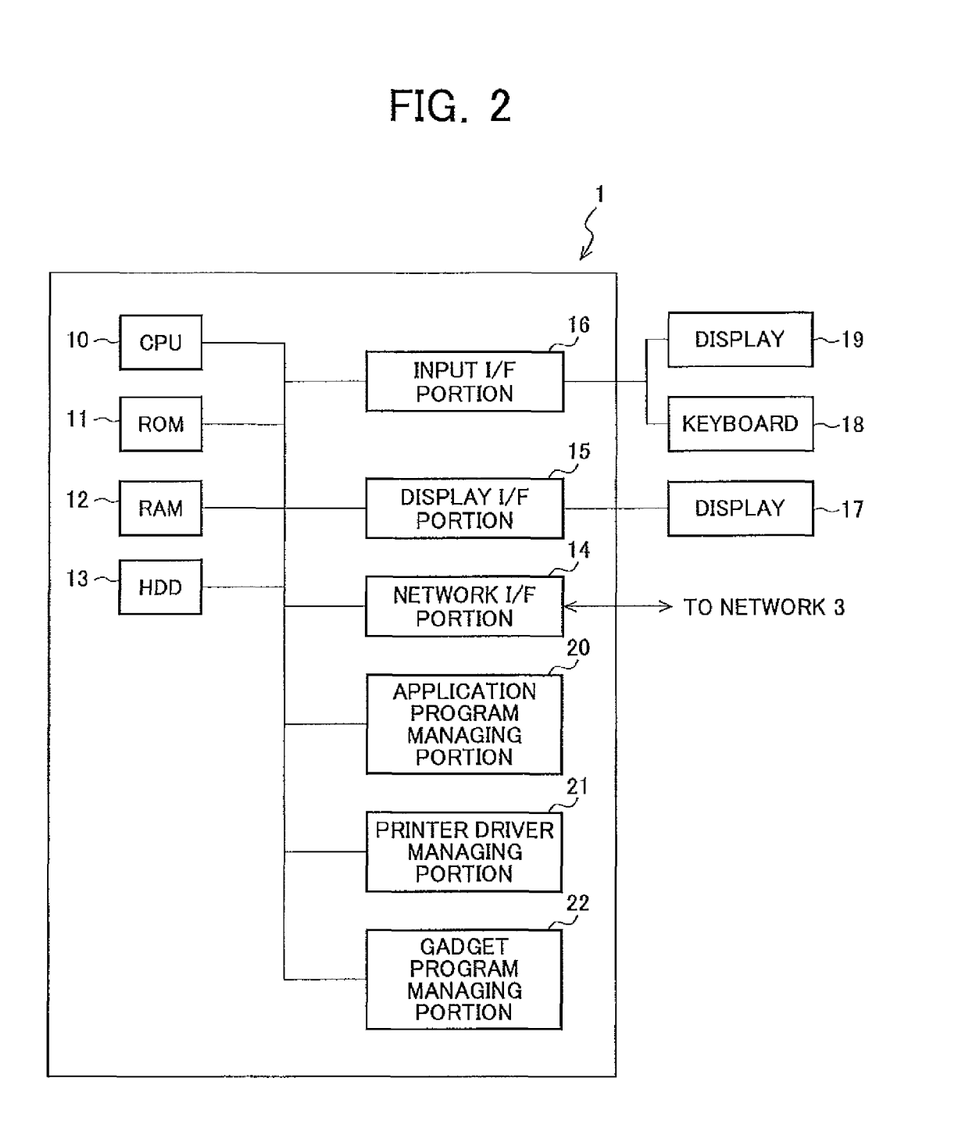
FIG. 2 is a block diagram showing an exemplary configuration of a PC as the image processing apparatus shown in FIG. 1.

FIG. 2 is a block diagram showing an exemplary configuration of a PC as the image processing apparatus shown in FIG. 1.

The PC 1 is provided with a CPU (Central Processing Unit) 10 which generally controls a main body of the PC 1, a ROM 11 which stores various kinds of programs and data etc., a RAM 12 which is used as a work area storing various kinds of data temporarily, an HDD (Hard Disc Drive) 13 which stores various kinds of programs and data etc., a network I/F (interface) portion 14 for connecting to the network 3, a display I/F portion 15 which is connected to a display 17, an input I/F portion 16 which is connected to a keyboard 18 and a mouse 19, for example, which is a pointing device, and the like.

The PC 1 is further provided with an application program managing portion 20, a printer driver managing portion 21, and a gadget program managing portion 22 as functional blocks. The application program managing portion 20 performs control needed for execution of various application programs such as a document creating program, a spread sheet program, and an electronic mail program. The application program managing portion 20 displays a screen for receiving an input operation from a user in various kinds of application programs on the display 17 and receives input from the mouse 19 and the keyboard 18 for performing necessary processing.

The printer driver managing portion 21 receives print requests from various kinds of application programs and performs processing for printing data as well as gives print instruction to an external image forming apparatus using the result of printing processing. A printer driver installed in the PC 1 is operated as a program for controlling printing on the PC 1, and by performing setting of the printer driver, it is possible to set the print condition and the like in printing processing. It is configured such that, when a user wants to change print setting of the printer driver, the printer driver managing portion 21 displays a standard property screen 47 as shown in FIG. 14 or a GUI which is a print setting screen on the display 17 by an operation from the user, allowing the user to change various kinds of print setting of the printer driver.

The gadget program managing portion 22 will be described below.

Figure 3:
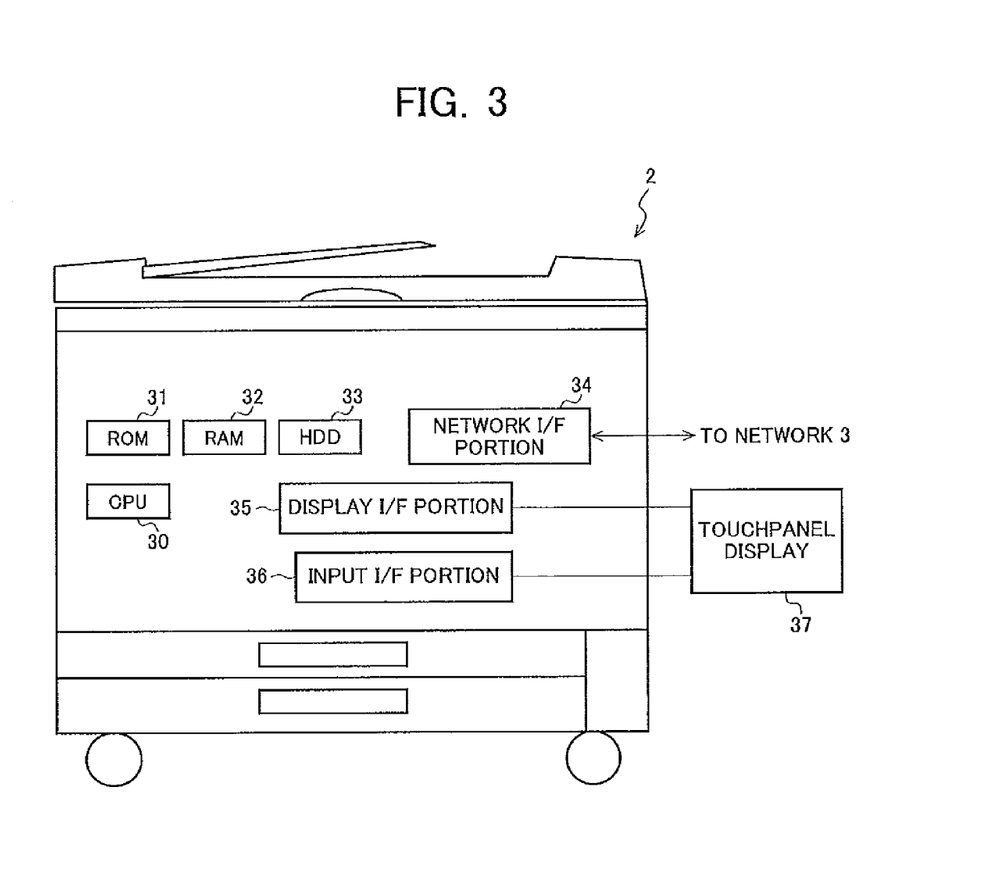
FIG. 3 is a block diagram showing an exemplary configuration of an MFP or the like as an image forming apparatus shown in FIG. 1.

FIG. 3 is a block diagram showing an exemplary configuration of an MFP or the like as an image forming apparatus shown in FIG. 1.

The MFP 2 is provided with a CPU 30 which generally controls a main body of the MFP 2, a ROM 31 which stores various kinds of programs and data etc., a RAM 32 which is used as a work area storing various kinds of data temporarily, an HDD 33 which stores data received through a network, a network I/F (interface) portion 34 for connecting to the network 3, a display I/F portion 35 which is connected to a touch panel display 37, an input I/F portion 36, and the like.

In the present invention, a gadget is used that is a lightweight Web application displayed on a desktop and that is an always staying on desktop UI. It is configured such that, when a button of a GUI of a gadget program displayed on a desktop is pressed, according to the pressed button, print setting of a printer driver that is set as default in a running application program is able to be changed.

Here, the gadget is a small and easy-to-use program which provides information so as to be able to be seen at a glance and is capable of easy access to frequently-used tools, so that weather information, latest news, transportation information, and the like are able to be distributed by connecting to a Web service and an efficient operation is able to be realized in conjunction with another program.

When the gadget is managed by Windows (registered trademark) sidebar (which is a window displayed on one side of a desktop), for example, in Microsoft Windows Vista (registered trademark), the gadget becomes possible to be used at all times. However, it is not always necessary to arrange the gadget in the sidebar. Hereinafter, although a gadget program itself is referred to as a gadget in the present invention, a GUI of the gadget program displayed on a display is also called a gadget.

Figure 4:
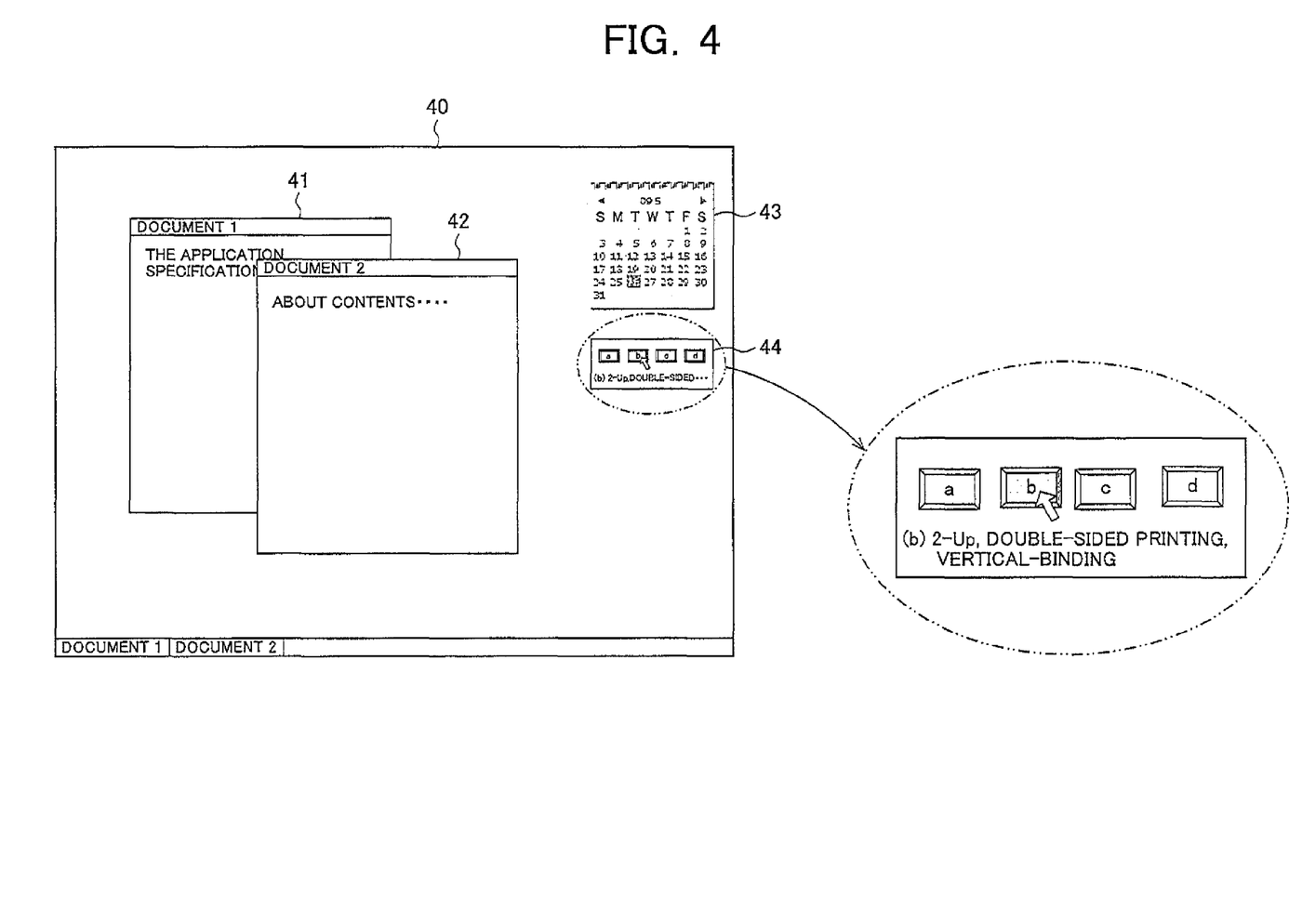
FIG. 4 is a view showing a screen displaying an example of a GUI (gadget) in the image processing apparatus of the present invention.
Figure 5:
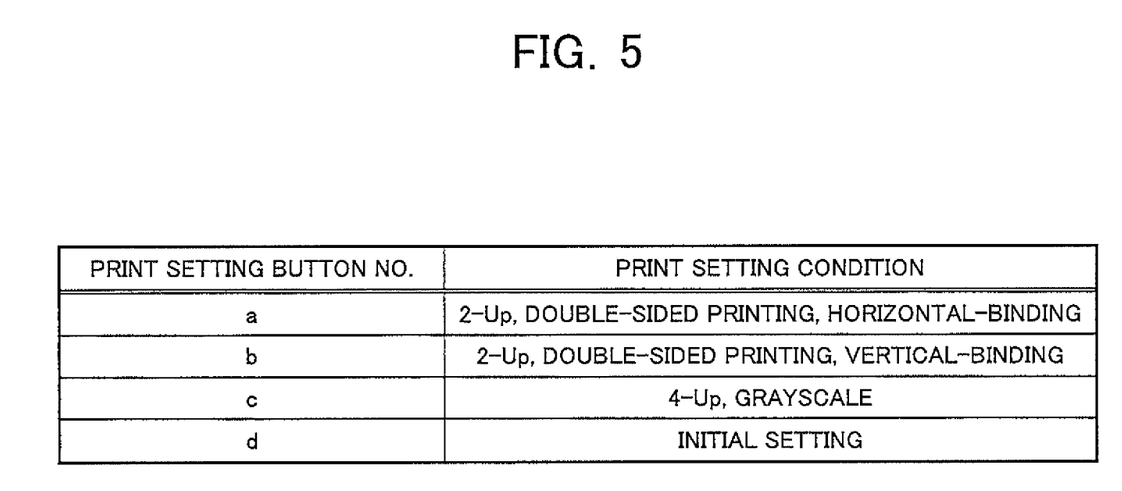
FIG. 5 is a view showing a correspondence relation between print setting buttons and print setting conditions.

FIG. 4 is a view showing a screen displaying an example of a GUI (gadget) in the image processing apparatus of the present invention and FIG. 5 is a view showing a correspondence relation between printing setting buttons and printing setting conditions.

On a desktop screen 40 shown in FIG. 4, two windows 41 and 42 of document creating programs are opened as application programs in operating, and the document creating program indicated by the window 42 which is on the front-most surface is in an active state. In addition, in an area of the right side of the desktop screen, a gadget 43 indicating calendar information and a print setting gadget 44 are displayed.

Here, the property screen 47 of the printer driver shown in FIG. 14 corresponds to a first GUI of the present invention and the print setting gadget 44 corresponds to a second GUI of the present invention.

The print setting gadget 44 is provided with, for example, four print setting buttons a to d, and to each of the print setting buttons a to d, as shown in FIG. 5, commonly used functions, such as N-Up and double-sided printing, and print setting conditions, such as a function for returning print setting to predetermined initial setting, are set. When a user positions a pointer to each part of the print setting buttons a to d in the print setting gadget 44 by a mouse or the like on the screen 40, the print setting condition which is set to each of the print setting buttons a to d is displayed under each of the print setting buttons a to d, and by clicking each of the print setting buttons a to d, the print setting condition of the corresponding print setting buttons a to d is able to be selected.

Figure 6:
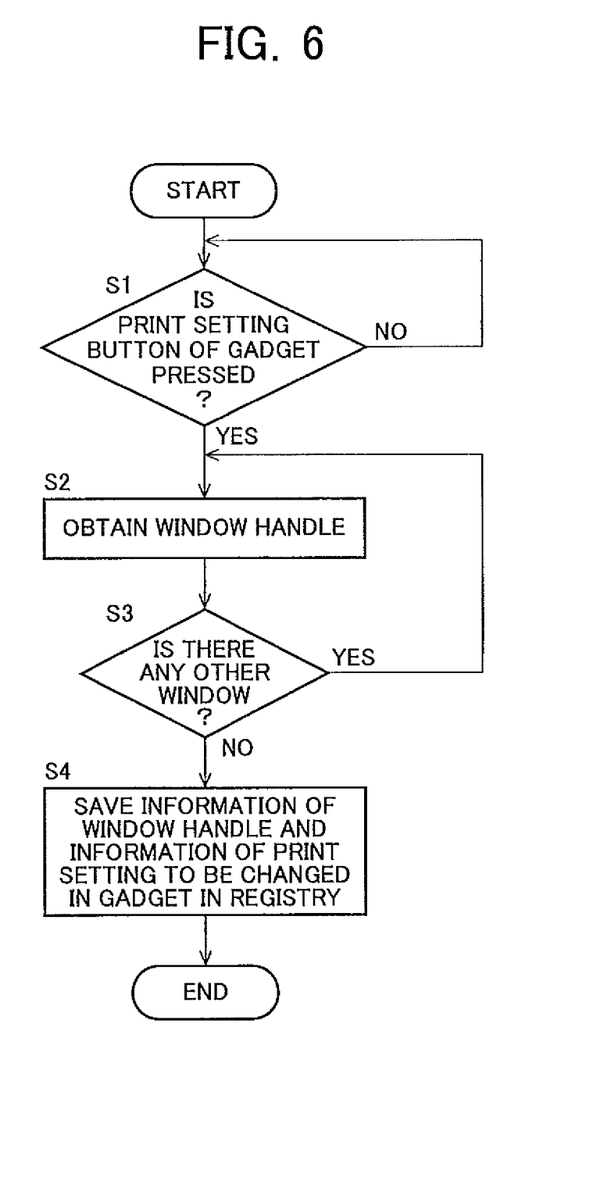
FIG. 6 is a flowchart for explaining processing when the print setting condition is changed.
Figure 7:
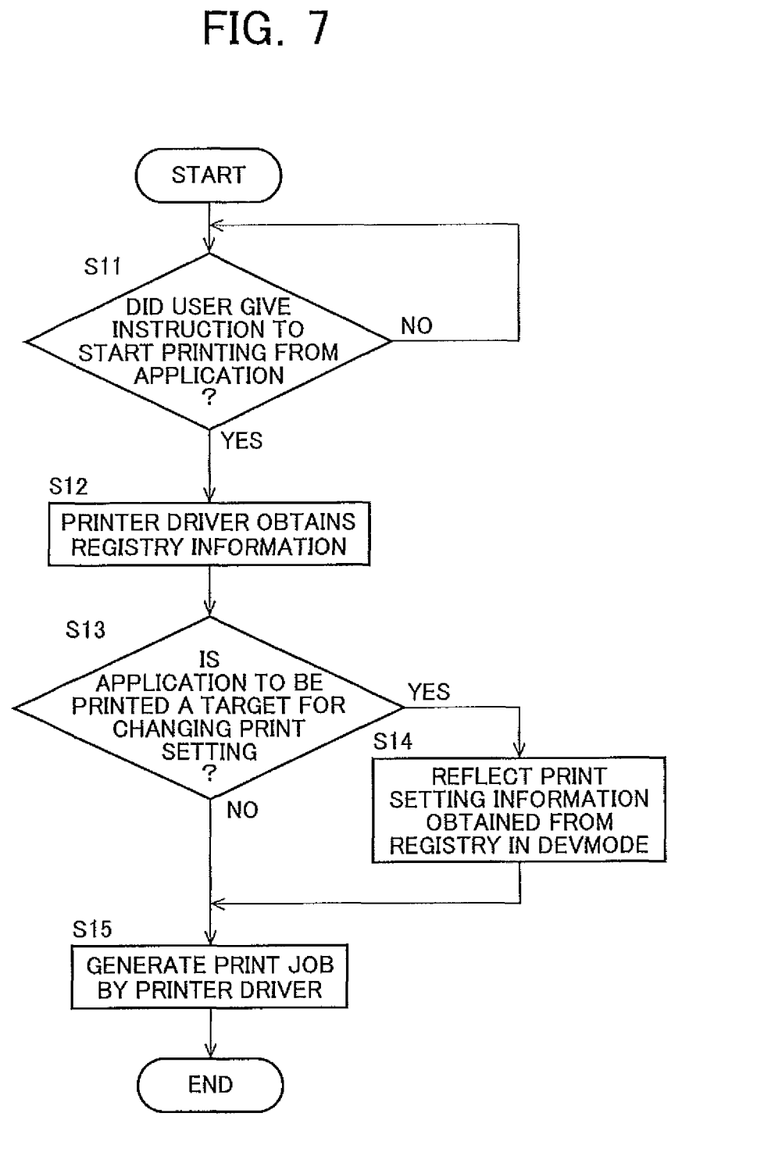
FIG. 7 is a flowchart for explaining processing until a printing job is generated when the print setting condition is changed.

Next, description will be given for processing when the print setting condition is changed. FIG. 6 is a flowchart for explaining processing when the print setting condition is changed and FIG. 7 is a flowchart for explaining processing until a printing job is generated when the print setting condition is changed.

While a user operates the mouse 19 and the keyboard 18 in the PC 1 to perform various operations with application programs of document creation, spread sheet and the like opened, by clicking the print setting buttons a to d of the print setting gadget 44 in the sidebar of the screen (hereinafter referred to also as "gadget operation"), the print setting is changed.

When any of the print setting buttons a to d of the gadget 44 is clicked (step S1), the gadget program managing portion 22 obtains a handle of a window opened (window ID, identifier) of an application program (step S2), and this operation is repeated until all handles of windows opened are obtained (step S3). The gadget program managing portion 22 of the PC 1 then saves obtained handles, application program names, and the print setting conditions selected by the print setting buttons in a registry. More specifically, when the print setting button of the gadget 44 is operated, with respect to all windows opened, a set of information of a window handle, an application program name, and the print setting condition (the print setting condition (b) "2-Up, double-sided printing, vertical-binding" in the case of FIG. 4) is recorded in the registry for each window.

In addition, even though not shown in FIG. 6, it is configured such that when a window is in the opened state, recording of a set of information of a window handle, an application program name, and the print setting condition recorded in the registry for each window is held, and when a window is closed, recording of a set of information of a window handle, an application program name, and the print setting condition of the window closed is deleted from the registry.

Next, when a print button in a toolbar of the application program opened (the document creating program in the case of FIG. 4) is selected and start of printing is instructed (step S11), the printer driver managing portion 21 of the PC 1 obtains registry information saved in the registry at step S4 (step S12). The printer driver managing portion 21 then judges whether the application program in execution from which the print instruction was given is an application program corresponding to the window saved in the registry at step S4 (step S13).

In the case of the application program whose window is saved at step S13, information of the print setting condition saved at step S4 is obtained and print setting of the DEV-MODE to be changed in a printer driver that is set as the default value is changed (step S14), and then printing data is generated (step S15).

Thus, when a window (e.g. window B) of an application program which is the same as a window (e.g. window A) which is opened by an application program operated during a gadget operation is opened after the gadget operation, if the window A is still opened, information of the print setting condition for this application program remains in the registry, therefore, the print setting in the gadget is reflected in printing in the window B. On the other hand, when all windows opened by the application program operated during the gadget operation are closed, information of the print setting condition for this application program is deleted from the registry, and even when opening the window B of the same application program as that of the window A after closing the window A, information of the print setting condition for this application program is deleted from the registry, therefore, print setting in the gadget is not reflected in printing in the window B.

For example, the default value of a printer driver is "1-Up, single-sided printing" as shown in the property screen 47 of FIG. 14 and the print setting button (b) of the gadget 44 is selected, print instruction is given from the application program whose window is opened when the print setting button (b) is selected, and when this window is opened, the setting value of N-Up printing and double-sided printing of the printer driver is changed to "2-Up, double-sided printing, vertical-binding" and then printing is performed.

Note that, the DEVMODE is an area storing setting information needed for printing processing in a printer driver and is a combination of a common area (Public DEVMODE) of fundamental setting information needed for normal printing processing (e.g. the number of print copies and permission/inhibition information of double-sided printing) and an expansion area (expanded DEVMODE) storing functions which are peculiar to the printer such as a staple function and a punch function, for example.

Moreover, when the application to be printed is not a target for changing print setting at step S13, a printing job is generated based on print setting of the printer driver set as the default value (step S15).

In the processing when the print setting condition is changed as described above, it is configured such that all handles of opened windows of application programs are obtained when the print setting button of the gadget is pressed. In the processing for obtaining handles of windows, however, it is also possible, with reference to Z order indicating an upper/lower relation among windows which overlap each other in coordinates of Z axis, to obtain only a handle of window that is active just before the print setting button of the gadget is clicked, in other words, a handle of the front-most window in Z order, and save it in the registry. Accordingly, changing of the print setting is enabled only for a printing request of the application program that is active just before the print setting button of the gadget is clicked.

Figure 8:
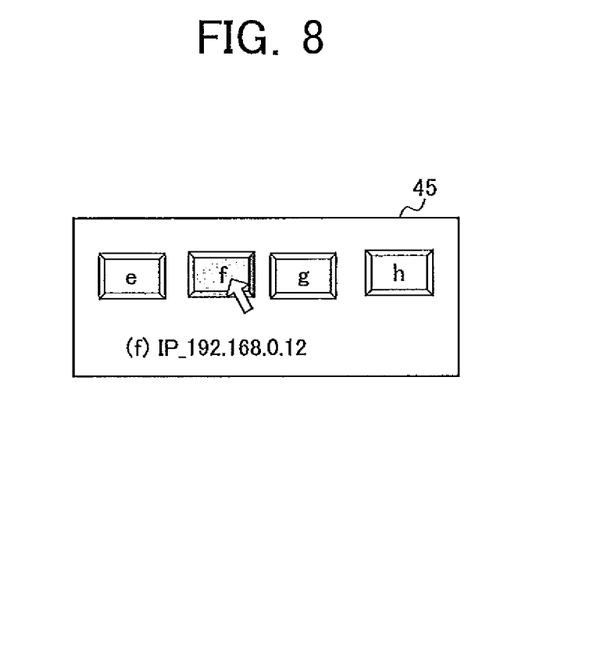
FIG. 8 is a view showing another example of a GUI (gadget) in the image processing apparatus according to the present invention.
Figure 9:
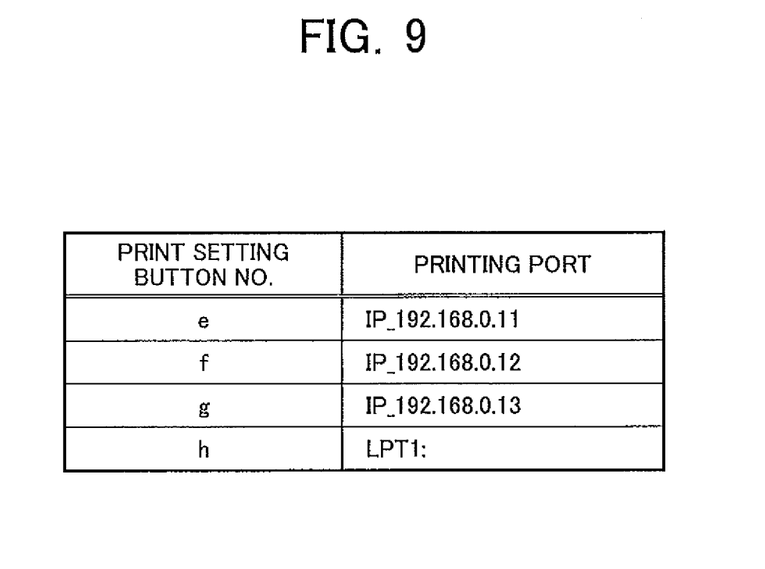
FIG. 9 is a view showing a correspondence relation between port setting buttons and printing ports.

FIG. 8 is a view showing another example of a GUI (gadget) in the image processing apparatus according to the present invention and is used for changing a port of a printer (IP address of a printer) as an output destination of printing data by an application program. FIG. 9 is a view showing a correspondence relation between port setting buttons and printing ports.

A gadget 45 shown in FIG. 8 is provided with, for example, four port setting buttons e to h and different printing ports correspond to each of the port setting buttons e to h as shown in FIG. 9. The Standard TCP/IP Port which is normally provided in the OS or an existing port is able to be set as a port of an output destination. When a user positions a pointer to each of the port setting buttons e to h of the gadget 45 with a mouse or the like, the printing port set to each of the port setting buttons e to h is displayed under each of the port setting buttons e to h, and by clicking each of the port setting buttons e to h, the corresponding printing port is able to be selected.

Figure 10:
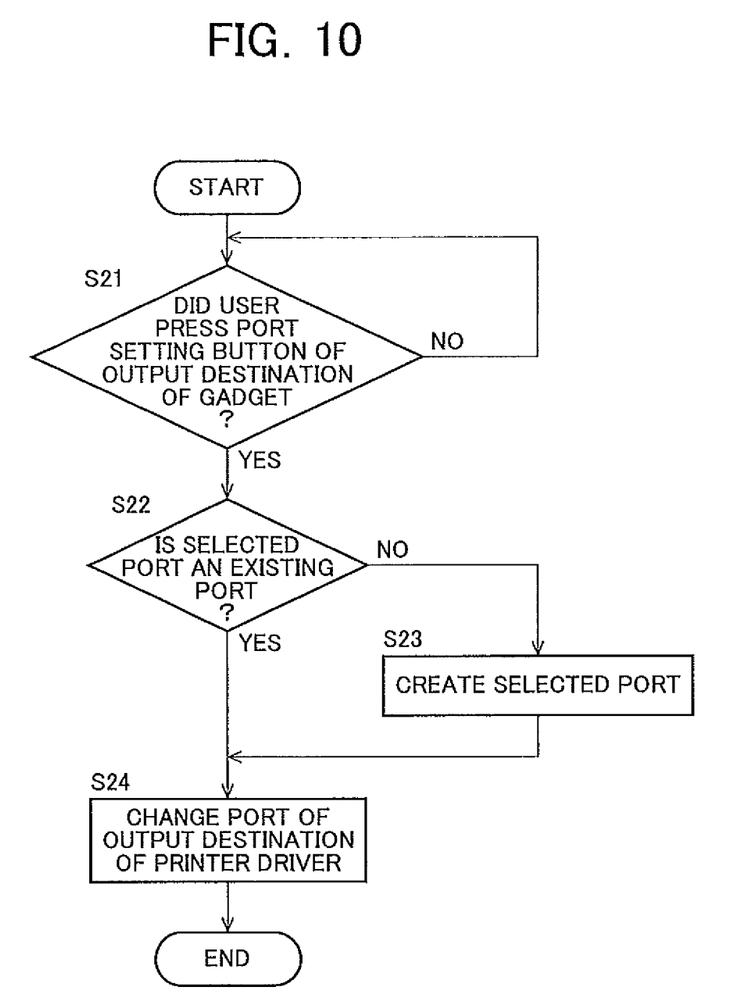
FIG. 10 is a flowchart for explaining a method for changing a printing port as an output destination.

FIG. 10 is a flowchart for explaining a method for changing a printing port to be an output destination.

When any of the port setting buttons e to h of an output destination of the gadget 45 in the sidebar of the screen of the display 17 is clicked by a user (step S21), the gadget program managing portion 22 judges whether a printing port corresponding to the selected port setting buttons e to h already exists in the PC 1 (step S22), and when the port already exists in the PC 1, switches the port of the output destination of a default of the printer driver to the selected port (step S24).

In addition, when the selected port does not exist in the PC 1 at step S22, the flow goes to step S23, where the port is created by setting an IP address as a printer of an output destination from candidates of IP addresses of printers that have been already stored and after that switching the port of the output destination of a default of the printer driver is switched to the created port (step S24).

In the case of FIG. 8, the port setting button f is selected, and when a printing port of IP_192.168.0.12 corresponding to the port setting button f does not exist, the Standard TCP/IP Port of IP_192.168.0.12 is created and then, the port of the output destination is switched to the created port.

Figure 11:
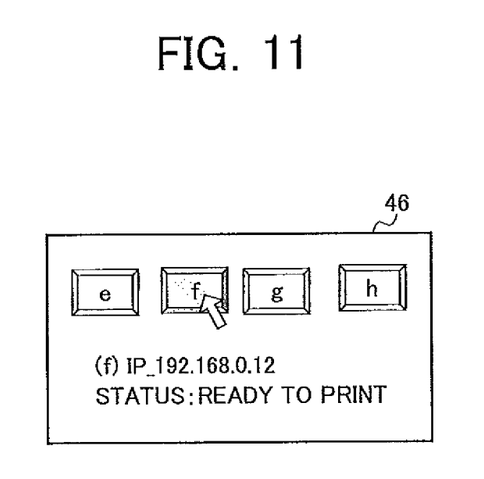
FIG. 11 is a view showing still another example of a GUI (gadget) in the image processing apparatus according to the present invention.

FIG. 11 is a view for explaining still another example of a GUI (gadget) in the image processing apparatus according to the present invention and is configured to further display the status indicating the operational state of a printer of an output destination in the gadget for changing a port of an output destination shown in FIG. 9.

Figure 13:
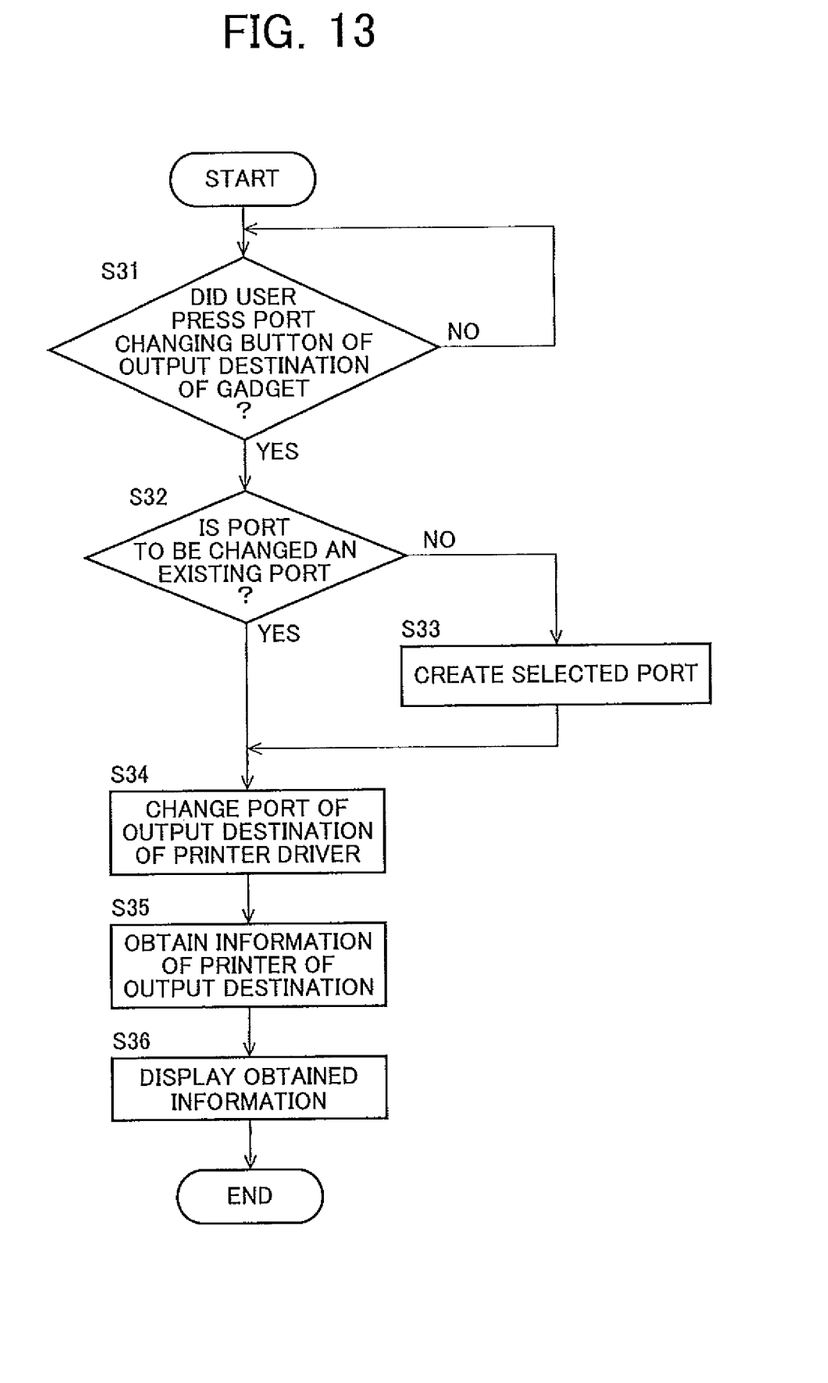
FIG. 13 is a flowchart for explaining processing for displaying the status of a connected printer, when a port of an output destination is changed.

FIG. 13 is a flowchart for explaining processing for displaying the status of a connected printer, when a port of an output destination is changed.

In the flowchart of FIG. 13, since processing from step S31 to step S34 is the same as processing from step S21 to step S24 of the flowchart shown in FIG. 10, the description thereof will be omitted.

When a user presses the port setting button of the gadget for changing a port of an output destination on a gadget 46 in the sidebar of the screen, a port of an output destination of a printer driver is changed (step S34). The PC 1 then inquires the status of a printer of the changed port of the output destination of the corresponding printer, and depending on the response from the corresponding printer, displays the status of the printer as shown in the gadget 46 of FIG. 11. The gadget 46 shown in FIG. 11 shows that the printer of the port (f) IP_192.168.0.12 is ready to print.

Figure 12:
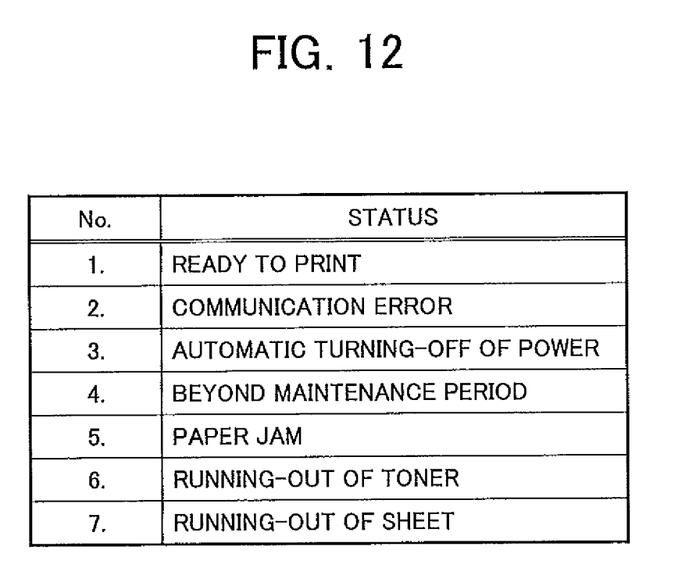
FIG. 12 is a view showing a list of the status that can be obtained.

Note that, FIG. 12 shows a list of the available statuses. As the status of a printer, information of printing availability, communication error, automatic turn-off of power, beyond maintenance period, paper jam, running-out of toner, running-out of sheet and the like is able to be obtained. Thus, a user is able to select a printer of an output destination with reference to these statuses. Note that, not a port of an output destination (IP address of a printer) but a printer may be displayed in the gadget 46.

Further, also in the case of changing a printing port, similarly to the case of changing the print setting condition, it may be configured such that a handle of an opened window of an application program is obtained and a printing port is changed when printing instruction is given from this application program.

As described above, as changing items of print setting conditions of a gadget, various items whose setting can be changed by a printer driver are able to be selected, including not only items of N-Up printing and double-sided printing or a port of an output destination but also items of the number of print copies or finishing such as staple or punch.

According to the present invention, operability is improved because the number of steps in printing setting performed by a user may be reduced when printing by changing print setting of a running application program. In addition, it is possible to perform printing by changing print setting for each application program easily. Further, when an output destination is changed for printing, this can be performed with the small number of operational steps and operability is improved, so that it is possible to recognize the status of an image forming apparatus after the output destination is changed.

The invention claimed is:

1. An image processing apparatus comprising:
   a controller and a memory; and
   a display having a screen capable of displaying a first GUI for changing a print setting, and a second GUI for changing the print setting of an application program currently running on the image processing apparatus, the second GUI always remaining on the screen,
   wherein the image processing apparatus is configured to give a print instruction to an image forming apparatus,
   the image processing apparatus is configured to change a setting of a printer driver set as a default for the application program currently running on the image processing apparatus by operation of the second GUI, and
   when a new application program is opened after operation of the second GUI, the print setting is applied to the new application program if the new application program is the same as the application program currently running on the image processing apparatus.

2. The image processing apparatus as defined in claim 1, wherein when the operation of the second GUI is carried out, changing of setting is enabled only for the application program whose window is active.

3. The image processing apparatus as defined in claim 2, wherein changing of the print setting changes a port of the image forming apparatus of an output destination.

4. The image processing apparatus as defined in claim 3, wherein when the port of the output destination is changed, an operational state of the image forming apparatus whose port is changed is displayed.

5. The image processing apparatus as defined in claim 4, wherein the second GUI has a plurality of buttons each corresponding to a different setting condition, and configured to be selected by a user.

6. The image processing apparatus as defined in claim 3, wherein the second GUI has a plurality of buttons each corresponding to a different setting condition, and configured to be selected by a user.

7. The image processing apparatus as defined in claim 2, wherein the second GUI has a plurality of buttons each corresponding to a different setting condition, and configured to be selected by a user.

8. The image processing apparatus as defined in claim 1, wherein changing of the print setting changes a port of the image forming apparatus of an output destination.

9. The image processing apparatus as defined in claim 8, wherein when the port of the output destination is changed, an operational state of the image forming apparatus whose port is changed is displayed.

10. The image processing apparatus as defined in claim 9, wherein the second GUI has a plurality of buttons each corresponding to a different setting condition, and configured to be selected by a user.

11. The image processing apparatus as defined in claim 8, wherein the second GUI has a plurality of buttons each corresponding to a different setting condition, and configured to be selected by a user.

12. The image processing apparatus as defined in claim 1, wherein the second GUI has a plurality of buttons each corresponding to a different setting condition, and configured to be selected by a user.

13. A print control method for giving print instruction to an image forming apparatus, comprising steps of:
- providing an image processing apparatus including a controller and a memory;
- causing a screen of the image processing apparatus to display a second GUI for changing a print setting of an application program currently running on the image processing apparatus, the second GUI being different from a first GUI for changing the print setting, the second GUI always remaining the screen; and
- carrying out printing after changing a setting of a printer driver set as a default for the application program currently running on the image processing apparatus by an operation of the second GUI,
- wherein when a new application program is opened after operation of the second GUI, the print setting is applied to the new application program if the new application program is the same as the application program currently running on the image processing apparatus.

14. A print control program for giving a printing instruction from an image processing apparatus having a controller and a memory to an image forming apparatus, the print control program being embodied in a non-transitory computer readable medium and configured to execute steps of:
- causing a screen of the image processing apparatus to display a second GUI for changing a print setting of an application program currently running on the image processing apparatus, the second GUI being different from a first GUI for changing the print setting, the second GUI always remaining on the screen; and
- carrying out printing after changing a setting of a printer driver set as a default for the application program currently running on the image processing apparatus by an operation of the second GUI,
- wherein when a new application program is opened after operation of the second GUI, the print setting is applied to the new application program if the new application program is the same as the application program currently running on the image processing apparatus.

* * * * *